US005492964A

United States Patent [19]
Tour et al.

[11] Patent Number: 5,492,964
[45] Date of Patent: * Feb. 20, 1996

[54] CERAMIC MATERIALS, METHOD OF PREPARING THE SAME AND HYDROGENATION AND OXIDATION PROCESSES USING THE SAME

[75] Inventors: James M. Tour; Shekar L. Pendalwar, both of Columbia, S.C.; Joel P. Cooper, North Plainfield, N.J.

[73] Assignee: University of South Carolina, Columbia, S.C.

[ * ] Notice: The portion of the term of this patent subsequent to Sep. 10, 2008, has been disclaimed.

[21] Appl. No.: 270,233

[22] Filed: Jul. 1, 1994

Related U.S. Application Data

[63] Continuation of Ser. No. 927,314, Dec. 24, 1992, abandoned, which is a continuation-in-part of Ser. No. 498,802, Mar. 23, 1990, Pat. No. 5,047,380.

[51] Int. Cl.$^6$ ..................................................... C08K 3/08
[52] U.S. Cl. ........................... 524/781; 524/785; 528/10; 502/158
[58] Field of Search ..................................... 524/781, 785; 528/10

[56] References Cited

U.S. PATENT DOCUMENTS

| | | | |
|---|---|---|---|
| 3,336,239 | 9/1962 | Bailey et al. | 252/430 |
| 3,419,593 | 5/1965 | Willing | 260/448.2 |
| 3,516,946 | 9/1967 | Modic | 252/429 |
| 3,775,452 | 11/1973 | Karstedt | 502/169 |
| 3,856,837 | 12/1974 | Chandra | 260/429 R |
| 3,865,759 | 2/1975 | Smith | 260/2.5 B |
| 3,931,047 | 1/1976 | Smith | 252/431 C |
| 4,157,313 | 12/1977 | Conan et al. | 252/431 P |
| 4,256,616 | 11/1978 | Hatanaka et al. | 260/18 S |
| 4,288,345 | 2/1980 | Ashby et al. | 528/15 |
| 4,421,903 | 2/1982 | Ashby et al. | 528/15 |
| 4,754,012 | 6/1988 | Yoldas et al. | 528/10 |
| 4,786,618 | 11/1988 | Shoup | 501/12 |
| 4,847,228 | 7/1989 | Saruyama | 502/158 |
| 4,871,790 | 10/1989 | Lamanna et al. | 523/333 |
| 4,921,589 | 5/1990 | Yates et al. | 204/157.5 |
| 4,946,893 | 8/1990 | Saito et al. | 524/862 |
| 5,047,380 | 9/1991 | Tour et al. | 502/158 |
| 5,049,636 | 9/1991 | Wolfgruber et al. | 528/33 |

OTHER PUBLICATIONS

Noll, *Chemistry & Technology of Silicones*, 1968 p. 190.
Hench et al., *Proc. S.P.E.I.—Int. Soc. Opt. Eng.* (1988) 76–85.
Hench, *Mater. Res. Soc. Symp. Proc.* (1988) 125:189–200.
Hench, *N.A.T.O. ASI Ser., Ser. E* (1985) 92:259–262.
Roy et al., *Mat. Res. Bull.* (1984) 19:169–177.
Roy et al., *Mat. Res. Soc. Symp. Proc.* (1984) 32:347–359.
Subbanna et al., *Mat. Res. Bull.* (1986) 21:1465–1467.
Schubert et al., *Chem. Mat.* (1989) 1:576–578.
McEwen et al., *J. Org. Chem* (1983) 48:4436–4438.
Lindlar et al., *Org. Synth.* (1973) V:880–883.
Ulrich, "Chemical Processing of Ceramics", *Chemical and Engineering News*, pp. 28–40 (Jan. 1, 1990).

*Primary Examiner*—John C. Bleutge
*Assistant Examiner*—Margaret W. Glass
*Attorney, Agent, or Firm*—Brumbaugh, Graves, Donohue & Raymond

[57] ABSTRACT

The present invention relates to ceramic materials containing a homogeneous dispersion of one or more metals, particularly sol-gel ceramic materials, a method of preparing the same, and processes for hydrogenating or oxidizing organic compounds using the same.

13 Claims, No Drawings

CERAMIC MATERIALS, METHOD OF PREPARING THE SAME AND HYDROGENATION AND OXIDATION PROCESSES USING THE SAME

This invention was made with Government support under Grant No. 2507RR07160-14. The Government has certain rights in this invention. This application is a continuation of application Ser. No. 07/927,314, filed on Dec. 24, 1992, now abandoned, which is a continuation-in-part of U.S. Ser. No. 07/498,802, now U.S. Pat. No. 5,047,380.

BACKGROUND OF THE INVENTION

The present invention relates to ceramic materials containing a homogeneous dispersion of metal, particularly sol-gel ceramic materials, a method of preparing the same, and processes for hydrogenating and oxidizing organic compounds using the same.

Ceramic materials exhibit various technologically important optical, mechanical and electronic properties. As dielectric materials, ceramics have a wide range of applications including uses in high energy particle beam accelerators, fusion experiments, free electron lasers and high powered lasers, high powered X-ray and microwave tubes, electrostatic generators, pulse power switches, space platforms, satellites, and solar arrays.

Organometallic sol-gel derived optics materials with excellent transmission properties and low thermal expansion coefficients have been synthesized. Hench, et al. *Proc. S.P.I.E. - Int. Soc. Opt. Eng.* (1988) 76; Hench, *Mater. Res. Soc. Symp. Proc.* (1988) 125:189, Hench, *N.A.T.O. ASI Ser., Ser. E.* (1985) 92:259. Ultra-low thermal expansion glass has been produced from transition metal-containing $SiO_2$ glasses. Shoup, U.S. Pat. No. 4,786,618.

Metal oxides have been used in the sol-gel process for encapsulation of metals in ceramic matrices. Roy et al., *Mat. Res. Bull.*, (1984) 19:169, Roy et al., *Mat. Res. Soc. Symp. Proc.*, (1984) 32:347; Subbanna et al., *Mat. Res. Bull.*, (1986) 21:1465. The standard method of producing metal-containing ceramic materials involves 1) dissolution of a metal salt and $Si(OR)_4$ in an aqueous/alcoholic solvent at a pH of less than 3 or greater than 9 to form a polymer gel; 2) drying of the gel to a xerogel, 3) calcination by heating to approximately 500° C. in air, and finally 4) reduction of the metal salt in hydrogen at 300° C. to 900° C. to produce the metal having a metallic(0) oxidation state.

Trialkylsilanes ($R_3SiH$) have been used to reduce transition metal salts to metals(0) in solution. It is also known in the art that triethoxysilane decomposes in aqueous solutions to form polysiloxane. In addition, the deposition of palladium onto a siloxane polymer has been achieved by using palladium(II) acetoacetonate and tetraethoxysilane followed by calcination. Schubert et al., *Chem. Mat.*, (1989) 1:576.

Thus the conventional approach for incorporation of a metal into a ceramic matrix requires harsh (high temperature) reaction conditions. Moreover, reduction of the metal salt occurs only after the calcination process, meaning metal reduction takes place on solid, calcinated material. Under these conditions uniform reduction of the metal salt cannot be ensured. Nonhomogeneous calcinated products are obtained due to the fact that entire metal particles remain as cations, or metal particles are reduced only on their outer surfaces to the metallic(0) state. This stems from the fact that, in general, reactions on solids are far less efficient than reactions in solution. Moreover, calcinated ceramic materials are difficult to work with in that they cannot be easily shaped, molded or used to cast thin films.

To overcome these deficiencies of the prior art, applicants sought and found a method of preparing a ceramic matrix material containing a homogeneous dispersion of one or more metals, preferably two or more metals, wherein at least one of the metals is in the form of metal particles using sol-gel methods without calcination, and wherein at least one metal is completely reduced to the zero oxidation state as it is dispersed in the ceramic matrix material. In achieving this goal, applicants have also discovered that the resulting sol-gel ceramic matrix material is not only useful for known applications of ceramic compositions, but functions as a highly reactive and selective catalyst for hydrogenation and oxidation reactions. This is unusual since, in catalyst development, one normally achieves either a highly reactive or a highly selective catalyst.

In general, heterogeneous catalysts have been found to be more reactive than their homogeneous counterparts. Heterogeneous catalysts are often more resilient to air and moisture and they may exhibit longer catalytic lifetimes than homogeneous catalysts. Moreover, heterogeneous catalysts can be removed from a reaction system by simple filtration, and can therefore be used in flow systems, which makes them particularly attractive for industrial processes. However, beterogenous catalysts are often inferior in terms of selectivity. Accordingly, the development of homogeneous organometallic complexes for selective hydrogenation has emerged rapidly over the past two decades. However, the optimum catalyst would yield high selectivity with the advantages of heterogeneous systems. Applicants have found that the encapsulation of at least one finely divided metal in a polysiloxane matrix according to the claimed invention is an effective and selective catalyst for hydrogenation and oxidation reactions at room temperature. The material is both water and air stable.

Silanes have been used in the presence of homogeneous palladium catalysts and acid to reduce alkynes, and the reduction of π-allyl palladium species to olefins can be effected using siloxane reagents. It has also been reported that platinum(II) complexes are reduced with triethoxysilane to form platinum(0) colloids and molecular hydrogen. These platinum(0) colloids are active hydrosilylation catalysts. However, the hydrogenated product obtained by these methods contains metal so finely dispersed that it cannot be removed, even by gel filtration. Instead, chromatography or distillation must be used to remove the metal from the final product.

SUMMARY OF THE INVENTION

Accordingly, the present invention relates to a compound comprising a polysiloxane matrix material containing a homogeneous dispersion of at least one metal, preferably two or more metals, wherein the polysiloxane matrix material is uncalcinated and at least one metal is substantially in the form of metal particles and in the zero oxidation state.

The present invention also relates to a method of preparing the uncalcinated polysiloxane matrix material containing a homogeneous dispersion of one or more metals, wherein at least one metal is in the form of metal particles in the zero oxidation state, which comprises mixing a siloxane compound having Si-H groups with at least one metal salt, preferably two or more metal salts, in an aqueous solution; wherein the siloxane compound is polymerized into a polysiloxane matrix, and at least one metal is reduced to the zero oxidation state, and particles of the reduced metal are homogeneously dispersed within the polysiloxane matrix.

The present invention further relates to a process for hydrogenating an organic compound, which comprises combining a catalytic amount of a polysiloxane matrix material containing a homogeneous dispersion of at least one metal, preferably two or more metals, wherein at least one metal is in the form of metal particles in the zero valent oxidation state and the organic compound in the presence of molecular hydrogen, said polysiloxane matrix material being prepared by the method of mixing a siloxane compound having Si-H groups with an aqueous solution comprising at least one metal salt.

The present invention also relates to a process for oxidizing an organic compound, which comprises combining a catalytic amount of a polysiloxane matrix material containing a homogeneous dispersion of at least one metal, preferably two or more metals, wherein at least one metal is in the form of metal particles and the organic compound in the presence of inert gases, oxygen, or hydrogen and mixtures thereof, said polysiloxane matrix being prepared by the method of mixing a siloxane compound having Si-H groups with an aqueous solution comprising at least one metal salt.

DETAILED DESCRIPTION OF THE INVENTION

Applicants' polysiloxane matrix material containing a homogeneous dispersion of at least one metal, preferably two or more metals, in the form of metal particles is unique in that it contains at least one metal in the zero oxidation state while still in the form of a sol, gel or xerogel. This enables the polysiloxane matrix material to be used in a variety of applications that require an uncalcinated material, i.e., applications that require molding, coating, and dipping. The polysiloxane matrix material also displays excellent adhesive qualities, most likely generated by Coulombic interactions among the metal particles dispersed within the matrix.

Suitable metals for encapsulation in the polysiloxane matrix material include those having a standard reduction potential ($E°$) greater than the reduction potentials of $H_2$ and Si-H. Particularly useful metals are palladium, rhodium, platinum, ruthenium, copper, silver, antimony, rhenium, iridium, gold, mercury, Dismuth, manganese, and other metals of similar reduction potentials.

Preferably one or more of these metal salts may be combined with salts of metals which may increase the Lewis acidity of the siloxane compound, such as nickel and aluminum salts.

At least one metal preferably is dispersed within the polysiloxane matrix material in the form of fine particles and in an amount ranging from about 0.001 to 15 mole percent, preferably 0.1 to 15 mole percent. Moreover, the finely particulate metal is homogeneously dispersed in the polysiloxane matrix material. Preferably, the particle size of at least one metal in the polysiloxane matrix material is less than 1000 Å, preferably less than 100 Å, more preferably from 15 to 50 Å.

The compound of the invention may be prepared according to the claimed method as follows. A silane compound or mixture of silane compounds is combined and reacted with at least one metal salt, preferably two or more metal salts, in an aqueous solution, i.e., an aqueous or organic/aqueous solution. At least one metal salt contains the metal to be dispersed as particles in the polysiloxane matrix.

Suitable silane compounds for use in the invention include those having Si-H groups and having the structure $H_nSi(OR)_{4-n}$, wherein $n=1$ to 3 and wherein R is a radical selected from the group consisting of aryl, alkyl, alkenyl, alkynyl, allyl and combinations thereof. For example, monoalkoxysilanes, dialkoxysilanes, trialkoxysilanes, and tetralkoxysilanes and mixtures of the same may be used. If tetraalkoxysilanes are used, they must be used in conjunction with another silane compound having an Si-H moiety. Preferably ethoxysilanes may be used, particularly triethoxysilane and mixtures of triethoxysilane with tetraethoxysilane. The silane compound or compounds should be freshly distilled before use.

On combination in the aqueous solution the silane compound polymerizes into a polysiloxane matrix. One or more metal salts may actually promote polymerization. At the same time that the polysiloxane matrix is formed, at least one metal salt is reduced to the metallic(0) oxidation state and is homogeneously dispersed in the polysiloxane matrix. Virtually uniform reduction of the metal from a cation to the metallic(0) state occurs during this sol-gel process. No heating or calcination steps are required, however calcination may be performed subsequently by conventional heating. Alternatively, the polysiloxane matrix material may be dried and stored in air for several weeks in the xerogel state.

During a reaction of at least one metal salt with the silane compound, hydrogen gas is produced. Both the silane and the hydrogen generated in situ can serve to reduce the metal from a cationic oxidation state to a metallic(0) oxidation state.

The aqueous solution may comprise water alone or a mixture of water and an organic compound miscible with water and capable of solubilizing the siloxane compounds used in the method. A useful organic compound is tetrahydrofuran (THF). If a mixture of water and THF is used, the volume ratio of THF:water is preferably in the range of 2:1 to 10:1, more preferably 5:1.

Suitable metal salts for use in the claimed method are those soluble in the aqueous or organic/aqueous solution and formed from metals having a standard reduction potential ($E°$) greater than the reduction potentials of $H_2$ and Si-H, for example, salts of palladium(II), rhodium(III), platinum(II), ruthenium(II), copper(II), copper(IV), silver(II), antimony(III), rhenium(I), iridium(IV), gold(I), mercury(II), bismuth(III), manganese(III) and combinations thereof and the like. Preferably, one or more of these metal salts may be combined with salts of nickel(II), aluminum(III) and the like and combinations thereof.

For example, if it is desired to disperse and encapsulate palladium in the polysiloxane matrix material, suitable metal salts for use in the method include, for example, palladium(II) acetate and palladium(II) chloride. If it is desired to disperse and encapsulate rhodium in the polysiloxane material, a suitable metal salt for use in the method is, for example, rhodium(III) chloride.

Applicants' method of preparing the polysiloxane matrix material may be carried out at room temperature, and preferably the reaction is allowed to proceed for at least 2 hours, preferably 4 hours. A more highly crosslinked matrix may be made with increased reaction time, for example 24 hours.

Depending on the siloxane compound and metal salts used in the above method, various polysiloxane matrix materials can be prepared according to this method. For example, reacting triethoxysilane with at least one metal salt results in a compound of the formula $[Si(H)O_{3/2}]_n$ $_{[SiO_2]}$ M(O) where M represents the metal. Reacting small amounts of triethoxysilane, larger amounts of tetraethoxysilane and at least one metal salt produces a compound of the formula $(SiO_2)_n \ldots M(O)$. Accordingly, the claimed compound may be prepared wherein it exhibits no Si-H residue.

The polysiloxane matrix material may be isolated from the solution after reaction by removal of the solvent by drying in vacuo.

In addition to its applications as a sol-gel ceramic material, the polysiloxane matrix material is an excellent heterogeneous, selective catalyst for hydrogenation and oxidation of organic compounds. In the case of hydrogenation using the claimed compound, the reaction proceeds without the need for an external hydrogen source, since hydrogen gas is produced in situ. In addition, applicants believe that such hydrogenation proceeds by hydrometallic hydrogenation rather than hydrosilylation followed by protodesilylation.

A hydrogenation process according to the claimed invention comprises mixing and reacting a siloxane compound, as described above, with an aqueous solution, as described above, of at least one metal salt, preferably two or more metal salts, as described above, and additionally an organic compound. The siloxane compound polymerizes into a polysiloxane matrix while at least one metal is reduced to the metallic(0) state and is homogeneously dispersed in the polysiloxane matrix material. The organic compound is hydrogenated by the polysiloxane matrix material and hydrogen. The polysiloxane matrix material may be removed from the reaction solution by filtration.

Remarkably, it has been found that when two or more metal salts are present, substantially only alkyne substrates are hydrogenated, i.e., alkene end products are not further hydrogenated to alkanes. While Applicants do not wish to be bound by any one theory, it is believed that additional metal salts may modify the Lewis acidity of the siloxane, thereby influencing catalytic selectivity, turnover numbers, and rates. Alternately, it may be that two or more metal salts form a multimetallic cluster which influences catalytic selectivity, turnover numbers, and rates.

Preferred metal salt combinations include $RhCl_3/Cu(NO_3)_2$, $RhCl_3/Cu(SO_4)_2$, $RhCl_3/Cu(CH_3CO_2)_2$, $RhCl_3/Al(NO_3)_3$, and $RhCl_3/Ni(NO_3)_2$. Results of hydrogenation of 5-decyne with these metal salt combinations is shown in Table III.

The oxidation process according to the claimed invention also comprises mixing and reacting a siloxane compound, as described above, with an aqueous solution, as described above, of at least one metal salt, preferably two or more menal salts, as described above, and additionally an organic compound. The aqueous solution may further comprise a terminal alkyne, $HC \equiv R$, preferably methyl propynoate or propargyl alcohol. While Applicants do not wish to be bound by any one theory, it is believed that the terminal alkyne activates the metal surface thereby enhancing the oxidation process.

As with hydrogenation the siloxane compound polymerizes into a polysiloxane matrix, while at least one metal is reduced to metallic(0) state and homogeneously dispersed in the polysiloxane matrix. The oxidation reaction is carried out under an inert, hydrogen, or oxygen atmosphere and combinations thereof. The organic compound is oxidized by the polysiloxane matrix material. Even in an inert atmosphere oxidation proceeds as hydrogen is removed from the organic compound due to a shift in equilibrium. Again, the polysiloxane matrix material may be removed by filtration.

The polysiloxane matrix material may be made in advance and stored at room temperature and pressure, and later used in either the hydrogenation or oxidation process. If prepared in advance, the polysiloxane matrix material only need be added to the aqueous solution before commencement or hydrogenation or oxidation.

Preferably, hydrogenation or oxidation should be carried out for at least 30 minutes, preferably 45 minutes, in addition to the time necessary to form the polysiloxane matrix material. If preparation of the polysiloxane matrix material and hydrogenation or oxidation are carried out at the same time, the reaction should be carried out for at least 2 hours, preferably 4.5 hours.

The claimed hydrogenation process provides excellent yields of reduced organic compounds without any significant side products. Hydrogenation of alkynes to alkenes proceeds with very little over-hydrogenation; Less than about 2 percent of the completely reduced alkane is observed. If two or more metal salts are present, virtually no over-hydrogenation or alkane end product is observed. However, if complete reduction to the alkane is desired, a terminal alkyne $HC \equiv CR$, preferably methyl propynoate or propargyl alcohol may be added to the reaction. Most preferably 5 to 10 mole percent methyl propynoate is used in the reaction solution for this purpose in addition, stereoselective hydrogenation may be carried out using the claimed polysiloxane matrix material.

The following non-limiting examples are designed to further illustrate the claimed invention.

EXAMPLE 1

Dispersion of Palladium(0) in Polysiloxane Using THF/Water (5:.1) as Solvent

To a solution of palladium(II) acetate (11 mg, 0.05 mmol) in THF (5 mL, distilled over sodium benzophenone ketyl prior to use) and water (1 mL deionized water, degassed by passing a stream of argon through it for 45 minutes) was added freshly distilled triethoxysilane (0.41 g, 0.46 mL, 2.5 mmol) over 5 minutes. The solution immediately became black and rapid hydrogen evolution was observed. The solution was stirred at room temperature for 4 hours. The solvent was removed by rotary evaporation and the polymer was dried in vacuo for 2.5 days to afford 0.14 g of shiny black flakes. Elemental Analysis: C, 1.43%; H, 1.92%; Pd, 0.15%; Si, 41.21%. IR (KBr pellet) 2263.7, 1166.7, 1065, 832.5, 738 $cm^{-1}$. Scanning electron microscopic analysis using energy dispersive analysis with X-rays (atomic %): Si, 95.53, 95.61; Pd, 4.47, 4.39.

It is believed that this reaction proceeded as follows:

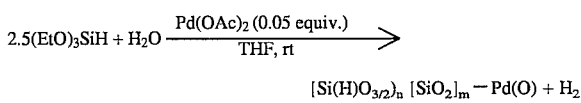

EXAMPLE 2

Dispersion of Palladium(0) in Polysiloxane Using Water as a Solvent

To a solution of palladium(II) acetate (11 mg, 0.05 mmol) in water (5 mL) was added freshly distilled triethoxysilane (0.41 g, 0.46 mL, 2.50 mmol) over 5 minutes. The solution immediately darkened and rapid hydrogen evolution was observed. The reaction mixture was stirred for 16 hours at room temperature and then filtered. The solvent was removed in vacuo to afford 0.1 g of a gray colored powder.

Elemental Analysis: C, 1.89%; H, 1.42%; Si, 43.53%; Pd, 0.43%. IR (KBr pellet): 3439, 2255, 1633, 1152, 852 cm$^{-1}$.

It is believed that this reaction proceeded as follows:

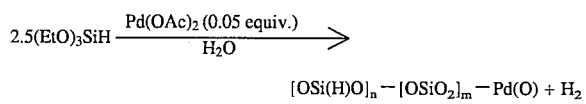

$$2.5(\text{EtO})_3\text{SiH} \xrightarrow[\text{H}_2\text{O}]{\text{Pd(OAc)}_2 \text{ (0.05 equiv.)}}$$

$$[\text{OSi(H)O}]_n - [\text{OSiO}_2]_m - \text{Pd(O)} + \text{H}_2$$

EXAMPLE 3

Dispersion of Palladium(0) in Polysiloxane Using a Mixture of Triethoxysilane and Tetraethoxysilane Polysiloxane matrix material containing a homogeneous dispersion of palladium(0) particles having no Si-H residue was prepared as follows. To a solution of palladium(II) acetate (0.05 mmol) in water and THF (volume ratio of 1:5) was added freshly distilled triethoxysilane (0.25 mmol) along with tetraethoxysilane (2.50 mmol). The solution became black and hydrogen evolution was observed. The solution was stirred for 4 hours. The solvent was then removed in vacuo, leaving behind black flakes. FTIR spectrum analysis showed no absorbance at ~2260 cm$^{-1}$, indicating that no Si-H residue was left on the polysiloxane matrix material.

EXAMPLE 4

Hydrogenation of 5-Decyne to Z-5-Decene with Dispersed Palladium Particles

To a solution of polysiloxane containing a homogeneous dispersion of palladium particles (0.13 g) prepared as described above in THF and water (0.05 mmol Pd), 5-decyne (0.138 g, 0.18 mL, 1.0 mmol) in a solution of THF (5 mL) and water (1 mL) was added. Hydrogen was bubbled through the solution for 30 seconds and the reaction was then placed under a hydrogen atmosphere (balloon). The reaction was stirred at room temperature for 4.5 h. Capillary gas chromatograph analysis showed complete consumption of the alkyne and a 94% yield of Z-5-decene using dodecane as an internal standard. The product was too volatile for an accurate isolated yield. However, a portion was isolated and analyzed spectroscopically. IR (neat) 2925.5, 2850.0, 1460.1 cm$^{-1}$. $^1$H NMR (300MHz, CDCl$_3$)δ 5.33 (br t, J=4.5 Hz, 2H), 2.01 (br q, J=5.6 Hz, 4H), 1.3-1.2 (m, 8H), 0.86 (t, J=6.8 Hz, 6H) [>12:1 Z/E stereochemistry]. $^{13}$C NMR (20 MHz, CDCl$_3$)δ 129.87, 30.25, 26.93, 22.25, 13.98.

EXAMPLE 5

In situ Hydrogenation of 5-Decyne with Rhodium

To a solution of rhodium(III) chloride trihydrate (1.3 mg, 0.005 mmol) in a mixture of THF (2.5 mL) and water (0.5 mL) was added 5-decyne (69 mg, 0.50 mmol). The solution was stirred for 10 minutes and then triethoxysilane (0.21 g, 1.25 mmol) was added. The system was closed and was stirred at room temperature for 6 hours. The volatiles were then removed in vacuo. A mixture of hexane (5 mL) and ether (1 mL) was added. The solution was dried over magnesium sulfate and filtered through a one inch plug of silica gel. The substrate was diluted with hexane/ether (5:1). The solvent was removed in vacuo. Analysis of the product by gas chromatography showed a 4:1 ratio of 5-decene to decane and a total yield of 71% based on a dodecane internal standard.

EXAMPLE 6

In situ Hydrogenation of 5-decyne to Z-5-decene with Rhodium and Copper Salts

To a solution of rhodium(III) chloride trihydrate (1.3 mg, 0.005 mmol) and copper(II) nitrate hemipentahydrate (5.8 mg, 0.025 mmol) in a mixture of THF (2.5 mL) and water (0.5 mL) was added 5-decyne (69 mg, 0.50 mmol). The solution was stirred for 10 minutes and then triethoxysilane (0.21 g, 1.25 mmol) was added. The system was closed and was stirred at room temperature for 7 hours. The volatiles were then removed in vacuo. A mixture of hexane (5 mL) and ether (1 mL) was added. The solution was dried over magnesium sulfate and filtered through a one inch plug of silica gel. The substrate was diluted with hexane/ether (5:1). The solvent was removed in vacuo. IR (neat) 2926.8, 2850.0, 1460.5 cm$^{-1}$; $^{13}$NMR (20 MHz CDCl$_3$) δ 129.87 31.99, 26.85, 22.38, 13.97. The Z-5 decene was too volatile for an accurate isolated yield. By gas chromatography with a dodecane internal standard the yield was 100%.

EXAMPLE 7

In situ Hydrogenation of Z-7-Dodecyn-1-ol with Rhodium and Copper Salts

To a solution of rhodium(III) chloride trihydrate (1.3 mg, 0.005 mmol), copper(II) nitrate hemipentahydrate (5.8 mg, 0.025 mmol) in THF (2.5 mL) and water (0.5 mL) was added 7-dodecyn-1-ol (91 mg, 0.50 mmol). The solution was stirred for 5 minutes and then triethoxysilane (0.21 g, 0.23 mL, 1.25 mmol) was added. The solution was stirred at room temperature for 8 hours. The volatiles were removed in vacuo and a solution of hexane (5 mL) and ether (1 mL) was added. The solution was dried over magnesium sulfate and filtered through a one inch plug of silica gel. The substrate was diluted with hexane/ether (5:1). The solvent was removed in vacuo. The product was then added to a solution of 3N hydrochloric acid (3 mL) and stirred at room temperature for 1 hour. The aqueous layer was extracted with ether (3×10 mL). The combined organics were dried over magnesium sulfate and filtered. The solvent was removed in vacuo to afford 0.088 g (0.48 mmol, 96%) of Z-7-Dodecen-1-ol which was a 14:1 Z:E mixture by spectroscopic analysis. Spectral analysis of the Z-isomer: IR (neat) 3434.8, 2929.0, 2857.1, 1459.2, 1056.1 cm$^{-1}$; $^1$H NMR (300 MHz, CDCl$_3$) δ 5.33 (m, 2 H), 3.62 (t, J=6.6 Hz, 2 H), 2.01 (br d, 4 H), 1.66 - 1.5 (m, 2H), 1.33 - 1.22 (m, 11 H), 0.88 (t, J=7 Hz, 3 H); $^{13}$C NMR (75 MHz, CDCl$_3$) δ 129.99, 129.67, 62.96, 32.74, 32.49, 31.93, 31.21, 29.69, 29.05, 28.58, 27.10, 26.90, 25.63, 22.32, 18.41, 13.99.

EXAMPLE 8

In situ Hydrogenation of Z-2-Tridecyn-1-ol

Z-2-Tridecen-1-ol was prepared according to the method of Example 6 using 2-tridecyn-1-ol (98 mg, 0.5 mmol), rhodium(III) chloride trihydrate (1.3 mg, 0.005 mmol), copper(II) nitrate hemipentahydrate (5.8 mg, 0.025 mmol), triethoxysilane (0.21 g, 0.23 mL, 1.25 mmol), THF (2.5 mL) and water (0.5 mL) at room temperature for 8 hours to afford 96 mg (0.48 mmol, 97%) of 2-tridecene-1-ol which was a 6:1 Z:E mixture by spectroscopic analysis. Spectral analysis of the Z-isomer: IR (neat) 3337.2, 2924.8, 2854.6, 1462.6, 1016.2 cm$^{-1}$; $^1$H NMR (300 MHz, CDCl$_3$) δ 5.56 (m, 2 H), 4.17 (d, J=5.9 Hz, 2H), 2.04 (br p, 2 H), 1.24 (m, 17 H), 0.86

(t, J=6.7 Hz, 3H); $^{13}$C NMR (75 MHz, CDCl$_3$) δ 1133.22, 58.58, 31.91, 29.62, 29.49, 29.34, 29.23, 27.44, 22.69, 15.24, 14.11.

EXAMPLE 9

Oxidation of 2-methyl-1,4-dihydrobenzoic Acid to 2-Methylbenzoic Acid

To a suspension of 2-methyl-1,4-dihydrobenzoic acid (0.085 g, 0.50 mmol; 81% pure, from Aldrich Chemical Company) in decalin (5 mL) under a nitrogen atmosphere was added the polysiloxane matrix material containing a homogeneous dispersion of metal particles (0.100 g as prepared according to Example 1). The solution was heated to reflux for 19 hours. On cooling the reaction mixture was diluted with hexane (25 mL) and extracted with aqueous sodium hydroxide (5%) solution (2×5 mL). The basic aqueous solution was acidified and extracted with chloroform (3×4 mL). The combined organic layer was dried over anhydrous sodium sulfate. Removal of solvent on rotary evaporator gave 2-methylbenzoic acid (0.065 g. 96%). IR(KBr) 3600-2000 (br), 2923, 1694, 1300, 920,731 cm$^{-1}$. $^1$H NMR (300 MHz, CDCl$_3$) δ 8.03 (ddd, J=8.5, 3.0, 1.5 Hz, 1 H), 7.42 (td, J=8.5, 1.5 Hz, 1H), 7.26 (td, J=8.5, 1.5 Hz, 1 H), 7.22 (dd, J=8.5, 1.5 Hz, 1 H), 2.64 (s, 3H).

EXAMPLE 10

Oxidation of 2-Methyl-1,4-Dihydrobenzoic Acid to 2-Methylbenzoic Acid with Rhodium and Aluminum Salts To a suspension of 2-methyl-1,4-dihydrobenzoic acid (0.085g, 0.50 mmol; 81% pure, from Aldrich Chemical Company) in decalin (5 mL) under a nitrogen atmosphere is added a polysiloxane matrix material containing a homogenous dispersion of rhodium and aluminum (0.100 g). The solution is heated to reflux for 19 hours. On cooling the reaction mixture is diluted with hexane (25 mL) and extracted with aqueous sodium hydroxide (5%) solution (2×5 mL). The basic aqueous solution is acidified and extracted with chloroform (3×4 mL). The combined organic layer is dried over anhydrous sodium sulfate. The solvent is evaporated using a rotary evaporator to give 2-methylbenzoic acid.

EXAMPLE 11

In situ Hydrogenation of 5-Decyne to Z-5-Decene with Rhodium, Copper and Aluminum Salts To a solution of rhodium(III) chloride trihydrate (1.3 mg, 0.005 mmol), copper(II) nitrate hemipentahydrate (2.90 mg, 0.0125 mmol) and aluminum(III) nitrate nonahydrate (0.188 g, 0.50 mmol) in a mixture of THF (2.5 mL) and water (0.5 mL) is added 5-decyne (69 mg, 0.50 mmol). The solution is stirred for 10 minutes and then triethoxysilone (0.21 g, 1.25 mmol) is added. The system is closed and stirred at room temperature for 7 hours. The volatiles are removed in vacuo. A mixture of hexane (5 mL) and ether (1 mL) is added. The solution is dried over magnesium sulfate and filtered through a one inch plug of silica gel. The substrate is eluted with hexane/ether (5:1). The solvent is removed in vacuo to give Z-5-decene.

EXAMPLE 12

Dispersion of Rhodium and Copper in Polysiloxane Using Water as a Solvent

To a solution of rhodium(III) chloride trihydrate (6.6 mg, 0.025 mmol) and copper(II) nitrate hemipentahydrate (5.8 mg, 0.025 mmol) in water (5 mL) is added freshly distilled triethoxysilone (0.41 g, 0.46 mL, 2.50 mmol) over 5 minutes. The reaction mixture is stirred for 16 hours at room temperature and then filtered. The solvent is removed in vacuo to give the polysiloxane metal product.

EXAMPLE 13

Dispersion of Rhodium, Copper and Aluminum in Polysiloxane Using Water as a Solvent To a solution of rhodium(III) chloride trihydrate (6.6 mg, 0.025 mmol), copper(II) nitrate hemipentahydrate (5.8 mg, 0.025 mmol) and aluminum(III) nitrate nonahydrate (0.188 g, 0.50 mmol) in water (5 mL), is added freshly distilled triethoxysilane (0.41 g, 0.46 mL, 2.50 mmol) over 5 minutes. The reaction mixture is stirred for 16 hours at room temperature and then filtered. The solvent is removed in vacuo to give the polysiloxane metal product.

Various examples of the hydrogenation process are shown in Table I. Reactions were allowed to stir for 2–5 hours before filtration of the polysiloxane matrix material through a plug of silica gel. The reduction proceeded readily on α, β -unsaturated esters and ketones. Excellent chemoselectivity was observed in shat while terminal olefin hydrogenated cleanly (entry 12), internal unactivated olefin remained unreduced (entry 14). The superb stereoselectivity of this process is demonstrated by entry 17 in the reduction of 5-decyne to Z-5-decene (>15:1 Z:E) in 100% yield, representing a simple alternative to the Lindlar reduction process.

The conventional method of stereoselective hydrogenation of unsaturated hydrocarbons is the Lindlar reduction process. McEwen et al., *J. Org. Chem.*, (1983) 48:4436; Lindlar et al., *Org. Synth.*, (1973) V:880. In the Lindlar process, palladium metal deposited on solid BaSO$_4$ along with quinoiine reduces alkynes to cis or Z alkenes. However, in the Lindlar reduction an external source of hydrogen is required, and the amount of hydrogen gas introduced into the reaction must be monitored carefully, otherwise over reduction to the alkane can occur. Furthermore, synthetic quinoline must be used in the Lindlar process, since commercially available quinoline normally contains trace amounts of sulfur, which is difficult to remove and inhibits catalytic activity.

Introduction of methyl propynoate (10 mole %) allowed for the conversion of an internal alkyne to an alkane (entry 17. The complete reaction required 24h). Similarly, Doth E-5-decene (entry 24) and E-butyl hexenoate (entry 6) were unreactive using triethoxysilane alone, but addition of one equivalent of methyl propynoate to the solution prior to the addition of triethoxysilane allowed for complete hydrogenation of the olefinic moiety. A similar effect was observed in the reduction of N,N-diethyl cinnamamide (entry 11) in that only partial reduction occurred in the absence of 10 mole % of methyl propynoate. The reaction rate for hydrogenation of terminal olefins was greatly increased using methyl propynoate. The methyl propynoate addition has a profound influence on the course of the reaction, although applicants are presently not able to rationalize its exact mechanistic action. A more vigorous evolution of hydrogen ensues in the presence of methyl propynoate. Presumably, more active surface sites of the metal are liberated by its addition.

In entries 14, 16 and 17, the capillary gas chromatograph yields were measured relative to a dodecane internal standard. The volatility of the products prohibited high isolation yields.

Table II lists several other examples of hydrogenation reactions according to the claimed invention using water alone as the aqueous solution. Again, no external hydrogen source was necessary, and no hydrosilylated material was obtained, meaning hydrogenation proceeds by a true hydrometallic reaction rather than hydrosilylation followed by protodesilylation. In certain cases, the yield was depressed due to volatility of the product (entries 3, 4 and 5). In entry 6, a second portion of triethoxysilane (2.5 equivalents) was added after 1 hour. In entries 7 (second reaction) and 12, only 1 equivalent of triethoxysilane was used. In entry 8, several isomeric products were obtained. In entry 11, 3 equivalents of sodium hydroxide were added. Propargyl alcohol was used in certain cases to achieve further hydrogenation, which acts in the same manner as methyl propynoate. In entries 3 and 8 of Table II, little or no reduction occurred without addition of propargyl alcohol. Entry 7 demonstrates the hydrogenation of alkynes to Z-alkenes with good selectivity by the addition of one equivalent of triethoxysilane. All the products in Table II underwent only standard extractive purification, yet spectral analysis showed no products other than those shown in Table II.

TABLE I

Hydrogenations Using Triethoxysilane and Catalytic Palladium(II) Acetate in THF/Water.

| Entry | Substrate | Product | % Yield |
|---|---|---|---|
| 1 | Ph–CH=CH–C(O)–Ph | Ph–CH$_2$–CH$_2$–C(O)–Ph | 100 |
| 2 | steroid with C$_8$H$_{17}$ side chain (4-en-3-one) | reduced steroid with C$_8$H$_{17}$ (cis/trans 3:1) | 96 |
| 3 | isophorone | No reaction | — |
| 4 | Ph–CH=CH–C(O)–OCH$_3$ | Ph–CH$_2$–CH$_2$–C(O)–OCH$_3$ | 91 |
| 5 | CH$_3$O–C$_6$H$_4$–CH=CH–C(O)–O–CH$_2$CH(Et)C$_4$H$_9$ | CH$_3$O–C$_6$H$_4$–CH$_2$–CH$_2$–C(O)–O–CH$_2$CH(Et)C$_4$H$_9$ | 92 |
| 6 | CH$_3$(CH$_2$)$_2$CH=CH–C(O)–O–(CH$_2$)$_3$CH$_3$ | No reaction | — |
| | | CH$_3$(CH$_2$)$_4$–C(O)–O–(CH$_2$)$_3$CH$_3$ | 99 |

TABLE I-continued

Hydrogenations Using Triethoxysilane and Catalytic Palladium(II) Acetate in THF/Water.

| Entry | Substrate | Product | % Yield |
|---|---|---|---|
| 7 | CH$_3$CH=CHCH=CHCO$_2$Et (hexa-2,4-dienoate ethyl ester) | ethyl hexanoate | 100 |
| 8 | 2H-chromen-2-one (coumarin) | chroman-2-one | 74 |
| 9 | EtO$_2$C-CH=CH-CO$_2$Et (diethyl maleate) | EtO$_2$C-CH$_2$-CH$_2$-CO$_2$Et | 98 |
| 10 | n-C$_5$H$_{11}$-C≡C-C(O)OC$_4$H$_9$-n | n-C$_7$H$_{15}$-C(O)OC$_4$H$_9$-n | 81 |
| 11 | Ph-CH=CH-C(O)NEt$_2$ | Starting material/reduced (1:3) | — |
|   |   | Ph-CH$_2$-CH$_2$-C(O)NEt$_2$ | 90 |
| 12 | CH$_2$=CH-CH$_2$-CH$_2$-C(O)-CH$_2$-C(O)-OEt | CH$_3$-CH$_2$-CH$_2$-CH$_2$-CH$_2$-C(O)-CH$_2$-C(O)-OEt | 81 |
| 13 | (+)-Longifolene | No reaction | — |
| 14 | n-C$_4$H$_9$-CH=CH-C$_4$H$_9$-n | No reaction | — |
|   |   | n-C$_{10}$H$_{22}$ | 100 |
| 15 | (CH$_3$CO$_2$)$_2$CH-CH$_2$-CH$_2$-CH=CH-CH=CH$_2$ | (CH$_3$CO$_2$)$_2$CH-(CH$_2$)$_5$-CH$_3$ | 94 |
| 16 | H-C≡C-C$_8$H$_{17}$-n | n-C$_{10}$H$_{22}$ | 35 |
| 17 | n-C$_4$H$_9$-C≡C-C$_4$H$_9$-n | n-C$_4$H$_9$-CH=CH-C$_4$H$_9$n (cis) | 100 |
|   |   | nC$_{10}$H$_{22}$ | 90 |

TABLE II

The reduction of alkenes and alkynes with 5 mole % Pd(OAc)$_2$ and triethoxysilane in water.

| Entry | Substrate | Time (h) | Product | Yield |
|---|---|---|---|---|
| 1 | trans-cinnamic acid (PhCH=CHCO$_2$H) | 4 | PhCH$_2$CH$_2$CO$_2$H | 93% |

TABLE II-continued
The reduction of alkenes and alkynes with 5 mole % Pd(OAc)$_2$ and triethoxysilane in water.
| Entry | Substrate | Time (h) | Product | Yield |
|---|---|---|---|---|
| 2 | 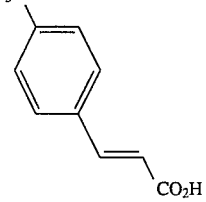 | 5 | 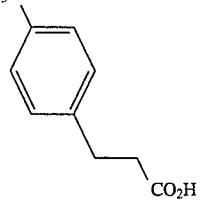 18:1 | 63% |
| 3 | 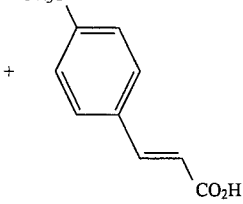 | 4 | No Reaction | |
|   |   | 5 | $H_{11}C_5-CO_2H$ | 69% |
| 4 | 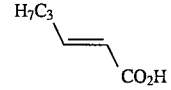 | 4 | No Reaction | |
|   |   | 4 | 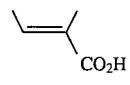 1:45 | |
| 5 | 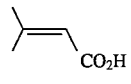 | 4 | 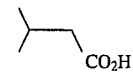 1:8 | |
|   |   | 14 | 1:4 | |
| 6 | 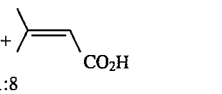 | 5 | $H_{11}C_5-CO_2H$ | 78% |
| 7 | $H_{11}C_5-\!\!\equiv\!\!-CO_2H$ | 4 | $H_{15}C_7-CO_2H$ | 92% |
|   |   | 4 | 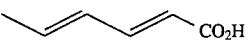 16:1:2 | 99% |
| 8 | 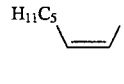 | 4 | | |
|   |   | 5.5 | $C_4H_9-CO_2H$ | 96% |
| 9 | 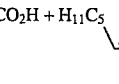 | 4 | $H_{11}C_5-CO_2H\;+$ 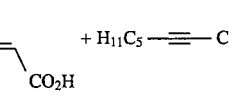 6:2:1 | 63% |
| 10 | 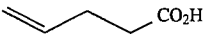 | 5 | 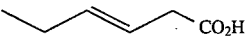 19:1 | 81% |
| 11 | 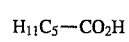 | 5 | 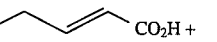 | 76% |

TABLE II-continued

The reduction of alkenes and alkynes with 5 mole % Pd(OAc)$_2$ and triethoxysilane in water.

| Entry | Substrate | Time (h) | Product | Yield |
|---|---|---|---|---|
| 12 | cyclohexadiene with CO$_2$H and methyl | 5 | benzoic acid derivative + cyclohexene-CO$_2$H + cyclohexane-CO$_2$H (1:12:2) | 95% |

TABLE III

Metal Salts as Co-Catalysts with Rhodium(III) Chloride

| Metal Salt | equivalents | time (hrs.) | Ratio[a] | Yield (est.)[c] |
|---|---|---|---|---|
| — | — | 6 | 4:1 | 71% |
| Cu(NO$_3$)$_2$ | 5% | 7 | >20:1 | 100% |
| Cu(SO$_4$)$_2$ | 5% | 20 | >20:1 | 87% |
| Cu(CH$_3$CO$_2$)$_2$ | 5% | 22 | 1.4:1[b] | 57% |
| Al(NO$_3$)$_3$ | 1 eq | 22 | 2.5:1[b] | 54% |
| Ni(NO$_3$)$_2$ | 10% | 23 | >20:1 | 58% |

[a]All ratios are of 5-decene to decane unless otherwise noted
[b]Ratio is of 5-decene to 5-decyne
[c]Yields were measured by gas chromatography based on an internal dodecane standard

We claim:

1. A compound comprising a polysiloxane matrix material containing a homogeneous dispersion of metals selected from the group consisting of rhodium and copper, rhodium and nickel, and rhodium and aluminum wherein at least one metal is in the form of metal particles, and wherein the polysiloxane matrix material is uncalcinated and at least one metal is in the zero oxidation state.

2. The compound according to claim 1, wherein at least one metal has a standard reduction potential greater than the reduction potential of H$_2$ and Si-H.

3. The compound according to claim 1 in a sol state.

4. The compound according to claim 1 in a gel state.

5. The compound according to claim 1 in a xerogel state.

6. The compound according to claim 1, wherein the one or more metals comprise rhodium and copper.

7. The compound according to claim 1 comprising rhodium and aluminum.

8. The compound according to claim 1 comprising rhodium and nickel.

9. The compound according to claim 1, wherein the metal particles have a size of less than 1000 Å.

10. The compound according to claim 1, wherein the metal particles have a size of less than 100 Å.

11. The compound according to claim 1, wherein the metal particles have a size of less than 50 Å.

12. The compound according to claim 1, containing 0.001 to 15 mole % metal.

13. The compound according to claim 1, containing 0.1 to 15 mole % metal.

* * * * *

UNITED STATES PATENT AND TRADEMARK OFFICE
CERTIFICATE OF CORRECTION

PATENT NO. : 5,492,964

DATED : February 20, 1996

INVENTOR(S) : James M. Tour, Shekar L. Pendalwar and Joel P. Cooper

It is certified that error appears in the above-identified patent and that said Letters Patent is hereby corrected as shown below:

On the title page: Item [21] should read --Item [63] PCT US91/1960 filed March 21, 1991 which is a continuation of Serial No. 07/927,314 filed December 24, 1992, abandoned, which is a continuation-in-part of Serial No. 07/498,802, filed March 23, 1990, Patent No.5,047,380--.

Col. 3, line 45, "Dismuth" should read --bismuth--

Col. 10, line 32, "shat" should read --that--

Col. 10, line 43, "quinoiine" should read --"quinoline--

Col. 10, line 54, "Doth" should read --both--

Col. 10, line 55, "24" should read --14--

Signed and Sealed this

Twenty-third Day of July, 1996

Attest:

BRUCE LEHMAN

*Attesting Officer*     *Commissioner of Patents and Trademarks*